United States Patent
Figge

(10) Patent No.: US 11,898,593 B2
(45) Date of Patent: Feb. 13, 2024

(54) MULTIPART ADJUSTMENT ELEMENT FOR A TOLERANCE COMPENSATION ASSEMBLY

(71) Applicant: Böllhoff Verbindungstechnik GmbH, Bielefeld (DE)

(72) Inventor: Hans-Ulrich Figge, Schloß Holte-Stukenbrock (DE)

(73) Assignee: Böllhoff Verbindungstechnik GmbH, Bielefeld (DE)

( * ) Notice: Subject to any disclaimer, the term of this patent is extended or adjusted under 35 U.S.C. 154(b) by 325 days.

(21) Appl. No.: 17/599,800

(22) PCT Filed: Mar. 17, 2020

(86) PCT No.: PCT/EP2020/057354
§ 371 (c)(1),
(2) Date: Sep. 29, 2021

(87) PCT Pub. No.: WO2020/200776
PCT Pub. Date: Oct. 8, 2020

(65) Prior Publication Data
US 2022/0145917 A1 May 12, 2022

(30) Foreign Application Priority Data
Apr. 4, 2019 (DE) .......................... 102019108910.7

(51) Int. Cl.
*F16B 5/02* (2006.01)
*F16B 19/10* (2006.01)
*F16B 37/06* (2006.01)

(52) U.S. Cl.
CPC ............ *F16B 5/0233* (2013.01); *F16B 5/025* (2013.01); *F16B 19/1072* (2013.01); *F16B 37/067* (2013.01)

(58) Field of Classification Search
CPC ...... F16B 5/0233; F16B 5/025; F16B 41/002; F16B 39/34
(Continued)

(56) References Cited

U.S. PATENT DOCUMENTS

| 5,288,191 A | 2/1994 | Rückert et al. |
| 6,776,566 B2 | 7/2004 | Kobusch et al. |

(Continued)

FOREIGN PATENT DOCUMENTS

| CN | 101135331 A | 3/2008 |
| CN | 101243260 A | 8/2008 |

(Continued)

OTHER PUBLICATIONS

English translation of the International Preliminary Report on Patentability for PCT/EP2020/057354 dated Sep. 28, 2021, (17 pages).

(Continued)

*Primary Examiner* — Flemming Saether
(74) *Attorney, Agent, or Firm* — Reising Ethington P.C.

(57) ABSTRACT

A multipart adjustment element for a tolerance compensation arrangement for automatically compensating for tolerances in the spacing between a first and a second component. The adjustment element comprises a bush, a dragging element, a contact disc, and a securing sleeve. The bush has a bore, an outer thread with a first direction, and a step. The dragging element comprises at least one spring arm protruding radially inwards, wherein a first axial end of the dragging element is arranged on the step in the threaded bush. The contact disc is arranged adjacently to the first axial end of the threaded bush and has a through-opening. The securing sleeve likewise has a through-opening and is arranged at least partly in the bore of the threaded bush with a press-fit (Continued)

Figure 1:
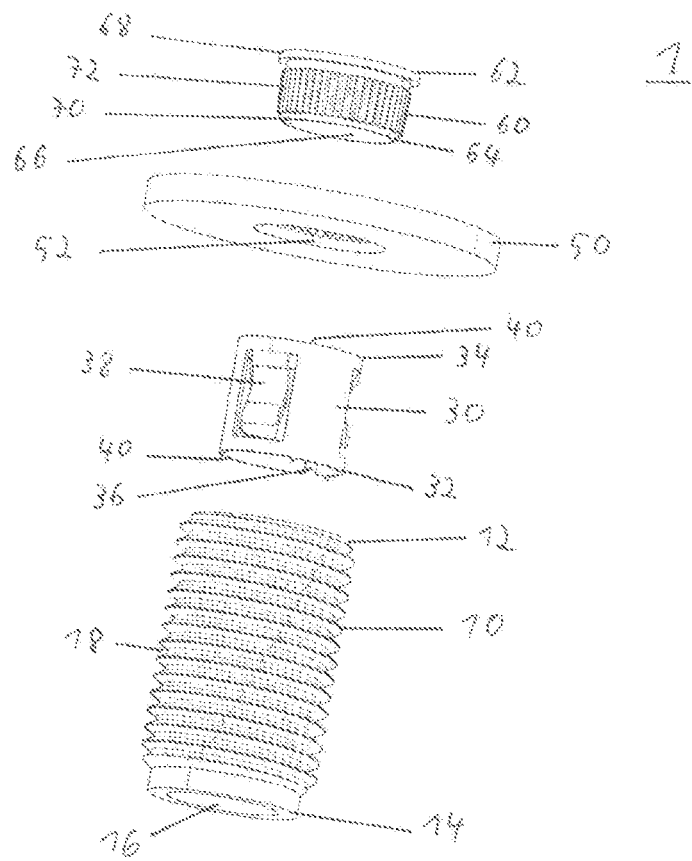

connection in order to securely connect the contact disc, the threaded bush, and the dragging element together.

20 Claims, 4 Drawing Sheets

(58) Field of Classification Search
USPC .................................. 411/546, 302, 303, 999
See application file for complete search history.

(56) References Cited

U.S. PATENT DOCUMENTS

| | | | |
|---|---|---|---|
| 7,025,552 | B2 | 4/2006 | Grubert et al. |
| 7,226,263 | B2* | 6/2007 | Schwarzbich ........ F16B 5/0233 411/546 |
| 8,066,465 | B2 | 11/2011 | Figge et al. |
| 8,202,033 | B2 | 6/2012 | Choi et al. |
| 8,827,585 | B2 | 9/2014 | Figge et al. |
| 9,771,962 | B2 | 9/2017 | Metten et al. |
| 10,746,212 | B2 | 8/2020 | Burger et al. |
| 10,914,331 | B2 | 2/2021 | Erpenbeck et al. |
| 11,168,722 | B2* | 11/2021 | Erpenbeck ............ F16B 41/002 |
| 11,506,233 | B2* | 11/2022 | Spickenheier .......... F16B 5/025 |
| 2006/0226312 | A1* | 10/2006 | Masuch ................ F16B 37/041 248/188 |
| 2006/0280579 | A1* | 12/2006 | Seidl ..................... F16B 5/0233 411/546 |
| 2017/0292557 | A1* | 10/2017 | Sherrill ................... F16B 37/04 |
| 2019/0078600 | A1 | 3/2019 | McClure |
| 2019/0226507 | A1 | 7/2019 | Erpenbeck et al. |
| 2020/0240459 | A1 | 7/2020 | Figge |

FOREIGN PATENT DOCUMENTS

| | | |
|---|---|---|
| CN | 104271964 A | 1/2015 |
| CN | 108361265 A | 8/2018 |
| CN | 109072960 A | 12/2018 |
| DE | 4224575 A1 | 3/1993 |
| DE | 19910511 A1 | 9/2000 |
| DE | 20314003 U1 | 11/2003 |
| DE | 102008055526 A1 | 6/2010 |
| DE | 102009044635 A1 | 12/2010 |
| DE | 102010000134 A1 | 7/2011 |
| DE | 102011001052 A1 | 9/2012 |
| DE | 102012102906 A1 | 10/2013 |
| DE | 102015122744 A1 | 6/2017 |
| DE | 102016118640 A1 | 4/2018 |
| EP | 1217222 A1 | 6/2002 |
| EP | 1304489 A2 | 4/2003 |
| ES | 2244711 T3 | 12/2005 |
| WO | WO2007008372 A1 | 1/2007 |
| WO | WO2016118694 A1 | 7/2016 |

OTHER PUBLICATIONS

CN Office Action for CN Application No. 202080026984.4 dated Sep. 2, 2022, (19 pages).
Written Opinion & International Search Report for PCT/EP2020/057354 dated May 13, 2020, (17 pages).

* cited by examiner

MULTIPART ADJUSTMENT ELEMENT FOR A TOLERANCE COMPENSATION ASSEMBLY

1. TECHNICAL FIELD

The present disclosure is related to a multipart adjustment element for a tolerance compensation arrangement for the automatic compensation of tolerances in the spacing between a first and a second component, a corresponding tolerance compensation arrangement, a connection between two components, a manufacturing method of the multipart adjustment element as well as a corresponding connection method.

2. BACKGROUND

Tolerance compensation arrangements for the automatic compensation of tolerances in the spacing between a first and a second component are generally known in the state of the art.

For example, DE 203 14 003 U1 describes a tolerance compensation arrangement. It comprises a fastening screw, a basic element with a thread bore being provided at the first component, having an adjustment thread and a fastening thread of a different diameter, and an adjustment element with a passage bore and a thread provided at the outer circumference. The adjustment thread of the basic element and the thread of the adjustment element form a thread pairing of a specific thread direction for adjusting the adjustment element for the purpose of tolerance compensation and the fastening thread of the basic element and the thread of the fastening screw form a thread pairing of the opposite thread direction for tightening the tolerance compensation arrangement. The adjustment element has a dragging section which forms a friction connection with the fastening screw which, when the fastening screw that is plugged through the adjustment element is rotated, co-rotates the adjustment element and which, when the adjustment element has abutted the second component after the tolerance compensation and the fastening screw is rotated further, releases in order to be able to tension the fastening screw with the fastening thread of the basic element. The dragging section is formed by an inner ring-shaped plastic section of the adjustment element which projects from the wall of the passage bore of the adjustment element radially to the inside to an extent that it can form the friction connection with the thread of the fastening screw.

A further tolerance compensation arrangement is described in DE 10 2012 102 906 A1. The tolerance compensation arrangement comprises a fixable basic element into which a fastening screw is screwable through a first thread pairing, an adjustment element with an outer thread which is screwable through a second thread pairing into the basic element wherein a first and a second anti-rotation protection is provided between basic element and adjustment element, with which correspondingly, a releasing of the adjustment element from the basic element during a transport and a locking of the adjustment element with the basic element is avoided.

A disadvantage of this arrangement is that a force transmission from the dragging element to the further components of the adjustment element exclusively takes place by means of frictional connection.

EP 1 304 489 A2 also relates to a tolerance compensation arrangement for the automatic compensation of tolerances caused by the manufacturing and/or assembly in the spacing between two components. The tolerance compensation arrangement consists of a screw, a nut and an adjustment element. The adjustment element has a left-handed outer thread which is screwable with a fitting left-handed inner thread of the nut, and a clamping section which is connectable with the screw by frictional connection and is rotatable relative to the screw when overcoming the frictional connection, so that the screw co-rotates the adjustment element via frictional connection during the process of screwing-in and by that, screws it out of the nut contrary to the insertion direction and, when the adjustment element has abutted the first component, enters into a screw connection with a right-handed inner thread of the nut by overcoming the frictional connection for the purpose of tensioning both components. By that, an automatic tolerance compensation in the spacing between the two components is achieved with a minimum number of parts.

A disadvantage of this last tolerance compensation may be that the clamping section of the adjustment element is formed by several springing fingers at the axial end of the adjustment element, wherein the springing fingers are separated by longitudinally extending slots. The manufacturing of these slots is complex as the adjustment element is generally manufacturable by turning, due to the slots, however, a milling is additionally necessary. Overall, the manufacturing process becomes expensive and complex by that. At the same time, the springing fingers are not protected during transport processes and/or processing steps so that they are often bent to the outside and their function could not properly be fulfilled without an additional work step, namely a bending back.

Finally, DE 10 2016 118 640 A1 describes a spring element for a device for compensating tolerances between a first and a second component. The spring element includes at least one spring arm which, seen in its longitudinal direction, includes two opposite end portions wherein at least one of the end portions has a larger distance to a longitudinal central axis of the spring element than an interim section of the spring arm which is arranged between the end portions, and wherein at least one of the end portions forms a radially outwardly protruding corner. In one embodiment, the compensation element has a step inside in order to avoid a slipping-through of the spring element when a fastening screw is plugged through. An anti-rotation protection is formed by tip corners of the spring element which press into the compensation element. Furthermore, due to these tip corners, an additional axial fixing of the spring element contrary to the insertion direction of the fastening screw can be omitted.

A disadvantage of this arrangement is that due to the functionality, which may be due to the impressing of the corners of the spring element into the compensation element, only specific materials, such as sufficiently soft materials, are usable. Therefore, the area of application of this arrangement is limited. It may not be used when higher forces between the components to be connected are supposed to be taken up by the tolerance compensation arrangement.

The object of at least some implementations of the present disclosure is therefore to provide an adjustment element for a tolerance compensation arrangement which may be suitable for a large application area, also for taking up higher forces, and is workable in a process-safe manner as well as realizes a reliable force transmission from dragging element to the threaded bush of the adjustment element at the same time. It is furthermore an object of at least some implementations of the present disclosure to provide a corresponding tolerance compensation arrangement, a connection, a manufacturing method for the adjustment element as well as a connection method with the tolerance compensation arrangement.

3. SUMMARY

The above object is solved by a multipart adjustment element, a tolerance compensation arrangement, a connection between a first and a second component, a manufacturing method of the multipart adjustment element as well as a connection method. Further embodiments and developments result from the subsequent description, the drawings as well as the appending claims.

A multipart adjustment element for a tolerance compensation arrangement for the automatic compensation of tolerances in the spacing or distance between a first and a second component comprises a threaded bush having a continuous bore, an outer thread of a first thread direction as well as a step that is formed inside of the threaded bush so that a first inner diameter adjacent to the first axial end of the threaded bush is larger than a second inner diameter adjacent to the second axial end of the threaded bush, comprises a dragging element with at least one radially inwardly protruding spring arm wherein the dragging element is arranged with a first axial end on the step which is formed in the threaded bush, as well as comprises an abutment disc adjacent to the first axial end of the threaded bush which includes a passage opening, and comprises a securing sleeve with passage opening which is arranged at least partially in a press-fit in the bore of the threaded bush in order to tightly connect the abutment disc, the threaded bush and the dragging element with each other.

For the better comprehensibility of the advantages and technical effects of the multipart adjustment element, firstly, the construction and then, the use in a tolerance compensation arrangement is described.

The multipart adjustment element consists of four separate parts, i.e. the threaded bush, the dragging element, the abutment disc and the securing sleeve. In connection with the construction of the multipart adjustment element, firstly, the dragging element is inserted from the first axial end of the threaded bush into the threaded bush. When being used in a tolerance compensation arrangement, the first axial end of the threaded bush corresponds to the end arranged such that it faces away from the basic element. In other words, in use, a fastening screw is inserted from the first axial end into the continuous bore of the threaded bush.

The dragging element has an outer diameter that is larger than the first inner diameter of the threaded bush. Therefore, the dragging element must be reduced accordingly in terms of its outer diameter when being inserted. The inserting takes place until the first axial end of the dragging element is in abutment with the step that is formed inside of the threaded bush. After the inserting, the dragging element is relieved and therefore radially abuts the inner wall of the threaded bush.

Now, the abutment disc is arranged adjacent to the first axial end of the threaded bush. A fixing of the abutment disc takes place by means of the securing sleeve or retaining sleeve. For this purpose, the securing sleeve is arranged at least partly in the press-fit in the bore of the threaded bush. A first axial end of the securing sleeve may serve for fixing the abutment disc, a second axial end of the securing sleeve abuts the second axial end of the dragging element and a radial outside of the securing sleeve abuts the radial inside of the threaded bush at least partly. Thus, the dragging element may be effectively clamped between the step in the inside of the threaded bush and the second axial end of the securing sleeve and is secured against a falling out from the threaded bush in an advantageous manner, e.g. also during a transport or a processing step of the adjustment element.

In the following, the use of the multipart adjustment element in a tolerance compensation arrangement is described. Beside the multipart adjustment element, the exemplary tolerance compensation arrangement includes a fastening screw as well as a basic element with a first inner thread and a second inner thread. The first inner thread has a first thread direction and engages with the outer thread of the threaded bush of the multipart adjustment element. The second inner thread of the basic element has a second thread direction which is contrary to the first thread direction, wherein the second inner thread interacts with an outer thread of the fastening screw. In other words, the first inner thread is arranged in front of the second inner thread in the insertion direction of the fastening screw.

In the beginning, the outer thread of the threaded bush of the multipart adjustment element engages with the first inner thread of the basic element and is screwed into the basic element as far as possible. Accordingly, in this state, the tolerance compensation arrangement may have the lowest axial length. The basic element is now fastened in an opening in a first component. For example, the basic element can be a blind rivet nut, the fastening of which is carried out in the known way. Alternatively, to the above example, a fastening of only the basic element in the first component first, and a subsequent screwing-in of the multipart adjustment element into the basic element is possible.

In a next step, a second component is arranged above the first component, wherein an opening in the second component is aligned with the opening in the first component. The fastening screw is plugged through the opening in the second component and the passage opening of the securing sleeve and comes into engagement with the at least one spring arm of the dragging element of the multipart adjustment element. A rotating of the fastening screw in the insertion direction causes a screwing-out of the adjustment element of the basic element due to the frictional connection between the at least one spring arm of the dragging element and the outer thread of the fastening screw, until the abutment disc abuts the second component. A further rotating of the fastening screw leads to an engagement of the fastening screw with the second inner thread of the basic element and a tensioning of the first and the second component.

An advantage of the multipart adjustment element is, as has already been described above, that the dragging element is effectively clamped between the step inside of the threaded bush and the second axial end of the securing sleeve. Therefore, the dragging element is secured against a falling-out of the threaded bush in an advantageous manner, e. g. also during a transport of the adjustment element.

A further advantage is that the insertion direction of the dragging element is arbitrary so that the multipart adjustment element may be assembled and is workable or processable in a process-safe manner.

According to a further embodiment, the dragging element may have a continuous slot extending along the longitudinal axis. In other words, the dragging element has an open ring form. Thus, the dragging element may be a punch-bent-part. This may allow an easy manufacturing of the dragging element.

The at least one spring arm of the dragging element may be attached on one side, only, so that the at least one spring arm has a free end. For realizing this feature, the dragging element has a first open ring adjacent to the first axial end and a second open ring adjacent to the second axial end which are interconnected by means of webs. The spring arm is connected with the second axial end so that the free end is present adjacent to the first axial end and thus at the side of the dragging element which faces the step. As has already been described above, an advantage of the dragging element is that it can be inserted in any desired direction into the threaded bush. Therefore, the free end can alternatively also be present adjacent to the second axial end or, in other words, the dragging element is inserted such that the free end is present at the side of the dragging element which faces away from the step.

In a further embodiment, the dragging element may have, at its first and at a second axial end, a plurality of projections extending in the longitudinal direction, which form a first anti-rotation protection with the first step and a second anti-rotation protection in connection with the securing sleeve. Beside a frictional connection, a form-fit connection is thus also established and a rotating of the fastening screw may be transmitted onto the multipart adjustment element in an effective manner. With the power of the impressing of the projections, axial tolerances are also compensated. Optionally, the compensation possibility is expanded by the webs, which is described in more detail in the following.

The dragging element may comprise a plurality of axially compressible webs. The axially compressible webs allow the dragging element to adapt to the available axial length regarding its axial length by means of an elastic arching when inserting the securing sleeve. The springing effect of the at least one spring arm is not impaired by that. With regard to the above-described embodiment with the first and the second open ring at the first and second axial end of the dragging element, the first and the second ring are connected by means of the plurality of axially compressible webs. In this way, the dragging element can thus be dimensioned sufficiently big regarding its length in order to compensate possible tolerances which may be caused by production in a reliable manner, so that a clamping of the dragging element may be realizable effectively.

In a further embodiment, the passage opening of the abutment disc may have a chamfer at the side which faces away from the threaded bush, which may include a knurling which, in connection with the securing sleeve, provides a third anti-rotation protection. An advantage of this embodiment is that by means of the chamfer, a flush inserting of the securing sleeve is realizable. In other words, a first axial end of the securing sleeve is arranged in alignment with a side of the abutment disc facing away from the threaded bush or in the portion of the chamfer of the abutment disc. Thus, in the later use of the multipart adjustment element within the frame of a tolerance compensation arrangement, a plane abutment of the abutment disc at the second component as well as a correspondingly high force transmission is possible.

In an embodiment, the securing sleeve may have a flange at a first axial end and a knurling adjacent to a second axial end at a radial outside, so that the securing sleeve engages adjacent to the first axial end, which may be with the flange, with the abutment disc, at the second axial end with a second axial end of the dragging element and at the radial outside at least partially with the radial inside of the threaded bush. In this context, the knurling may have a conical form so that the knurling engages with the inside of the threaded bush and forms a fourth anti-rotation protection. The connection between the individual elements which has been established in this way may be tight so that a transport of the corresponding multipart adjustment element may be possible in a safe way. Furthermore, a rotating of the individual components of the multipart adjustment element to each other is prohibited to the greatest possible extent or almost completely by means of the present anti-rotation protection.

In another embodiment, the securing sleeve may include an outer chamfer at a second axial end. A clamping-in of the dragging element between securing sleeve and step in the threaded bush is realizable effectively with the outer chamfer.

Finally, the threaded bush, the dragging element, the abutment disc and the securing sleeve may be made of steel or stainless steel. The dragging element may be made of spring steel. The multipart adjustment element which is formed of these materials may be suitable for application areas where high forces must be received, which may be in comparison with state-of-the-art arrangements where the adjustment element is made of plastic material.

A tolerance compensation arrangement includes a multipart adjustment element and a basic element wherein the basic element is fastened at the first component and includes a first inner thread of a first thread direction, which is in engagement with the outer thread of the threaded bush of the multipart adjustment element, and the basic element includes a second inner thread with a second thread direction, which is opposite to the first thread direction, wherein in use the second inner thread interacts with an outer thread of a fastening screw, so that the fastening screw, when being inserted into the multipart adjustment element and being rotated, co-rotates the multipart adjustment element via the dragging element through friction connection, thereby screwing it out of the basic element against the insertion direction for the purpose of tolerance compensation and, when the adjustment element has abutted the first component, is screwable with the second inner thread of the second thread direction for tensioning the two components. The tolerance compensation arrangement thus includes the multipart adjustment element. With regard to the arising technical effects and advantages, reference is therefore made to the above descriptions in order to avoid repetitions.

In a further embodiment of the tolerance compensation arrangement, the basic element may be a blind rivet nut. By that, it is realizable that the first and the second inner thread are realized within the same element. In alternative embodiments, the first and the second inner thread can also be realized in separate parts which jointly form the basic element.

In a further embodiment, the tolerance compensation arrangement furthermore may include a fastening screw.

A connection between a first and a second component takes place by means of the tolerance compensation arrangement as well as a fastening screw. As is already the case with respect to the tolerance compensation arrangement, reference is here also made to the above explanations as to the multipart adjustment element with regard to the resulting technical effects and advantages, in order to avoid repetitions.

A manufacturing method of a multipart adjustment element includes the steps: providing a threaded bush, a dragging element, an abutment disc as well as a securing sleeve, inserting the dragging element into the threaded bush from the first axial end, which may be by reducing an outer diameter of the dragging element before the inserting and subsequent relieving, arranging the abutment disc adjacent to the first axial end of the threaded bush and arranging the securing sleeve at least partially in a press fit in the bore of the threaded sleeve, in order to tightly connect the abutment disc, the threaded bush and the dragging element with each other. The multipart adjustment element can be produced by means of this manufacturing method. Therefore, reference is again made to the above descriptions regarding the multipart adjustment element with respect to the resulting advantages and technical effects.

In a further embodiment of the manufacturing method, the step of providing the dragging element includes: punching the dragging element in the form of a strip or as a strip of a metal layer, respectively, and bending the punched dragging element into a tube shape so that a slot in the longitudinal direction of the dragging element is present and the outer diameter is changeable. By means of this step, it is on the one hand emphasized that the dragging element is a punch-bent-part. On the other hand, it is shown that an additional processing of the dragging element, e. g. by means of a milling or the like, is not necessary.

A connection method for connecting a first component with a second component by means of the tolerance compensation arrangement with a fastening screw includes the steps: fastening the basic element at the first component, plugging the fastening screw into the passage opening of the tolerance compensation arrangement through an opening in the second component, rotating the fastening screw until the abutment disc abuts at the second component and tensioning the first and the second component by means of the interacting of the outer thread of the fastening screw with the second inner thread of the basic element. Thus, by means of this connection method, two components are connectable by using the tolerance compensation arrangement and thus also of the multipart adjustment element. The advantages and technical effects achieved with the connection method therefore correspond with the above-discussed advantages and technical effects.

4. BRIEF DESCRIPTION OF THE DRAWINGS

Figure 2:
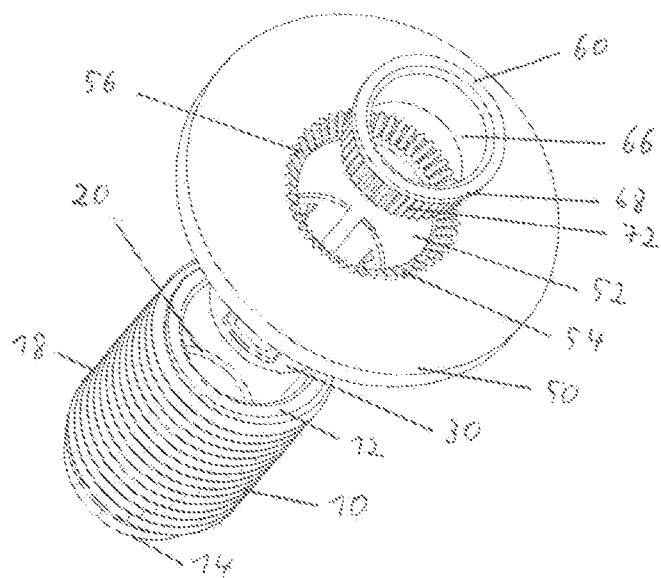
Figure 3:
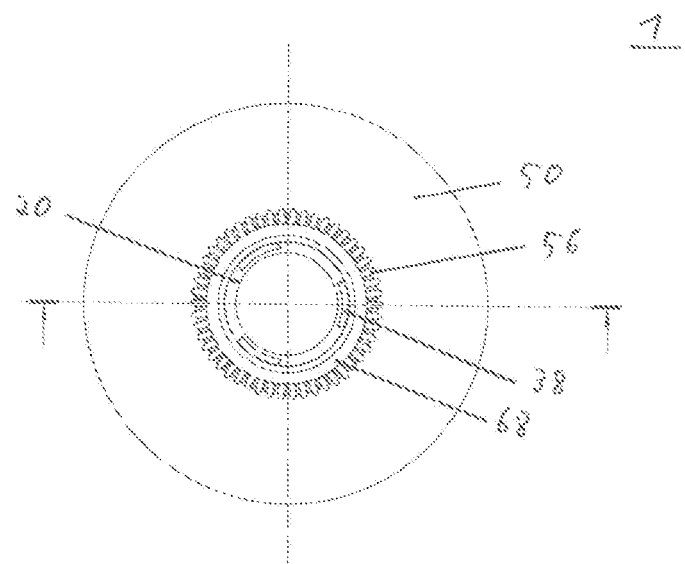
Figure 4:
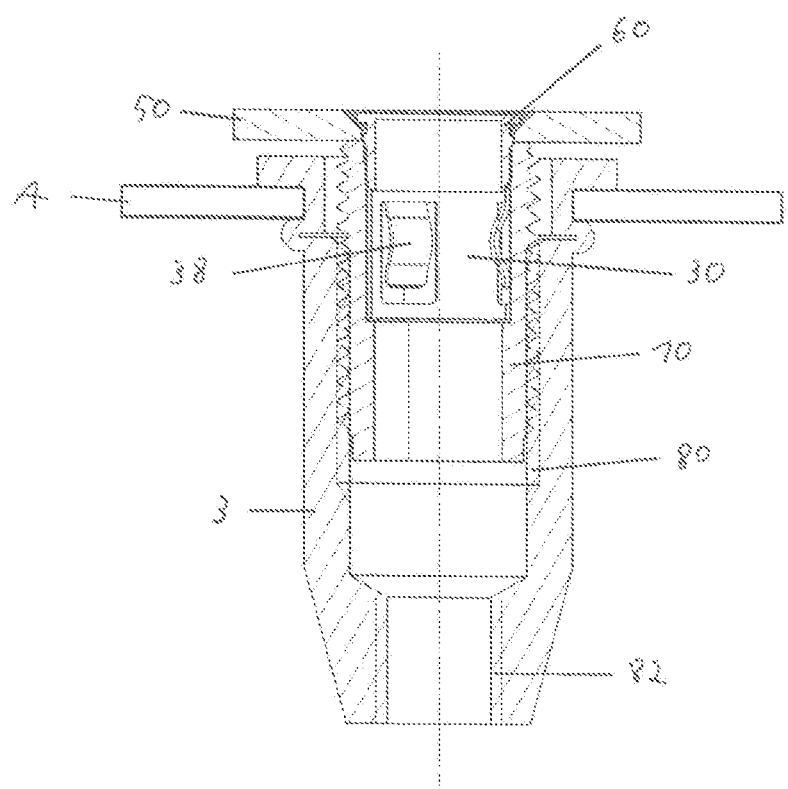
Figure 5:
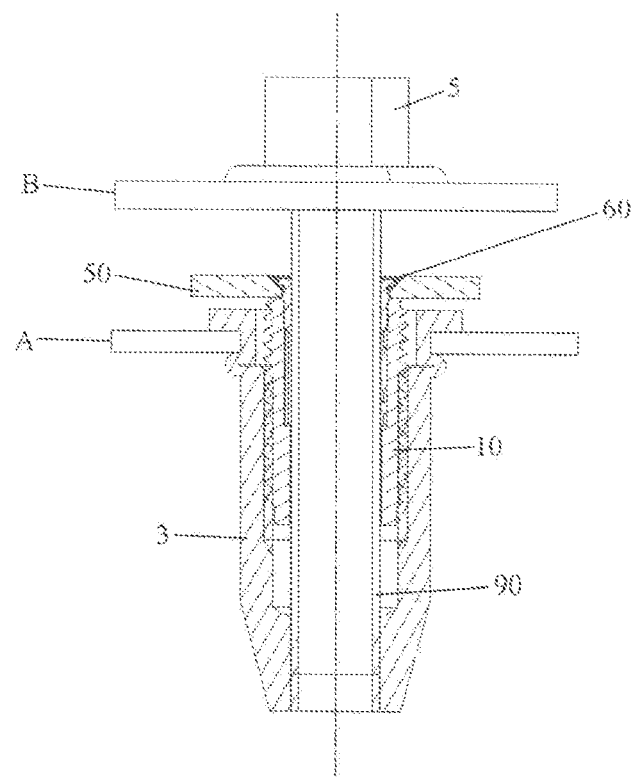
Figure 6:
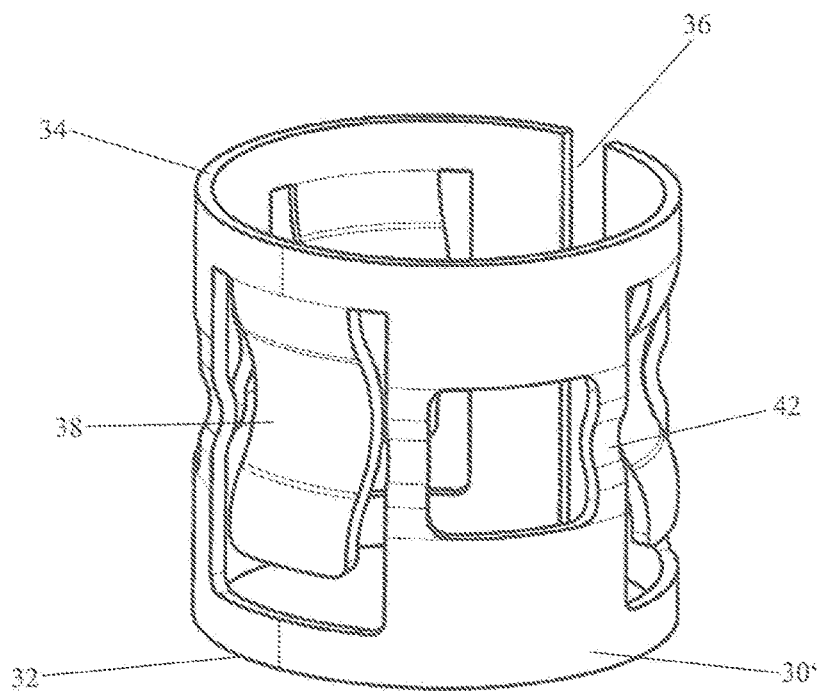
Figure 7:
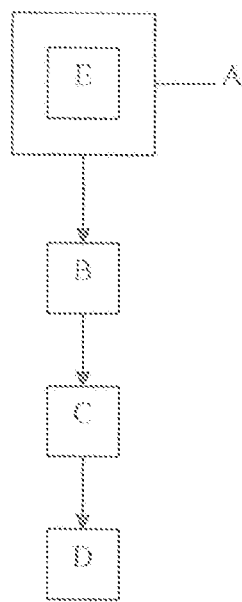
Figure 8:

In the following, the present disclosure will be described in detail with reference to the drawings. In the drawings, the same reference signs denote the same components and/or elements. They show:

FIG. 1 a first exploded view of an embodiment of a multipart adjustment element, FIG. 2 a second exploded view of an embodiment of a multipart adjustment element, FIG. 3 a top view on an embodiment of a multipart adjustment element, FIG. 4 a first sectional view of an embodiment of a tolerance compensation arrangement, which is arranged at a first component, FIG. 5 a partial sectional view of an embodiment of a connection between a first and a second component by means of the tolerance compensation arrangement, FIG. 6 a perspective view of an alternatively designed dragging element, FIG. 7 a flow diagram of an embodiment of a manufacturing method of the multipart adjustment element, and FIG. 8 a flow diagram of an embodiment of a connection method.

5. DETAILED DESCRIPTION

In the following, an embodiment of the multipart adjustment element is described in detail with reference to the drawings. Steel or stainless steel may be used as the material for the component parts of the multipart adjustment element.

Firstly, with reference to the FIGS. 1 to 3, an embodiment of the multipart adjustment element 1 is described. The adjustment element 1 consists of a threaded bush 10, a dragging element 30, an abutment disc 50 as well as a securing sleeve 60.

The threaded bush 10 includes in the known manner a continuous bore 16 as well as an outer thread 18. In contrast to most of the known threaded bushes of the state of the art, the threaded bush 10 includes a step 20 formed inside. As a result, a first inner diameter adjacent to a first axial end 12 is larger than a second inner diameter adjacent to a second axial end 14 of the threaded bush 10. The step 20 provides an abutment surface for the dragging element 30, which is emphasized later.

In the present example, the dragging element 30 includes three radially inwardly protruding spring arms 38 and may be a punch-bent-part. Accordingly, the dragging element 30 includes a first open ring at the first axial end 32 and a second open ring at the second axial end 34. In this context, the term open ring means that the dragging element 30 is not a part having a circumferentially closed form but rather, the dragging element 30 includes a slot 36 extending in the longitudinal direction of the dragging element 30. In order to guarantee a safe retention of the dragging element 30 inside the threaded bush 10, the initial outer diameter of the dragging element 30 is larger than the first inner diameter of the threaded bush 10. The dragging element 30 may consist of spring steel.

For inserting the dragging element 30, the spacing provided by the slot 36 is reduced so that the outer diameter of the dragging element 30 is reduced overall. After the inserting, i.e. when the first axial end 32 of the dragging element 30 abuts the step 20, the dragging element 30 is relieved so that it abuts the radial inner side of the threaded bush 10 with its radial outer side.

In the shown embodiment, the spring arms 38 of the dragging element 30 are attached on one side, only. Here, the attachment is present adjacent to the second axial end 34, i.e. at the second open ring. The remaining end of the spring arms 38 is free, i.e. it is not connected with the first axial end 32 or the first open ring, respectively.

The first open ring and the second open ring are connected with each other via a plurality of axially extending webs. Starting at the slot 36, the following sequence arises in the circumferential direction: web, spring arm 38, web, spring arm 38, web, spring arm 38, web.

The embodiment of the dragging element 30' illustrated in FIG. 6 essentially corresponds with the above-described dragging element 30. In contrast to that one however, axially compressible webs 42 are provided between the first and the second open ring. The length or construction height of the dragging element 30' may be available in excess, as the axially compressible webs 42 realize an elastic bending to the inside and the dragging element 30' may therefore compensate tolerances caused by production in the multipart adjustment element 1 in an effective manner. The functioning of the spring arms 38 is not influenced by that.

Now, again with respect to FIGS. 1 to 3, the dragging element 30 includes at its first 32 and its second axial end 34 a plurality of projections 40 extending in longitudinal direction. These projections 40, in the present case three projections 40 per axial end 32, 34, may be present in the form of tips which provide an anti-rotation protection per axial end 32, 34. This is emphasized in the further course of the description, when explaining the assembly of the multipart adjustment element 1. As is later made clear within the description of the assembly of the individual components, axial tolerances are also compensated with the power of the pressing-in of the projections 40. Optionally, the compensation possibility by the axially compressible webs 42 is extended, which were described above in conjunction with the dragging element 30' according to FIG. 6.

Even if this is not explicitly shown in FIG. 6, the dragging element 30' includes a plurality of projections 40 in the same way.

The abutment disc 50 includes a passage opening 52. At the side which faces away from the threaded bush 10, a chamfer 54 is provided at the passage opening 52. The chamfer 54 includes a knurling 56.

The securing sleeve 60 includes a passage opening 66 as well as a flange 68 at a first axial end 62. In axial direction, a clearance, a conically extending knurling 72 as well as an outer chamfer 70 follow the flange 68.

When assembling the adjustment element 1, firstly, the dragging element 30 in inserted into the threaded bush 10 from the first axial end 12 of the threaded bush 10. For this purpose, as is described above, the outer diameter of the dragging element 30 is reduced by reducing the spacing provided by the slot 36. When the dragging element 30 abuts the step 20, it is relieved. Consequently, the radial outer side of the dragging element 30 abuts the radial inner side of the threaded bush 10.

In the illustrated example, the inserting of the dragging element 30 takes place in a way that the first axial end 32 of the dragging element 30 abuts the step 20. In an alternative embodiment, the dragging element 30 can also be inserted vice versa, i.e. the free end of the spring arms 38 does not have to be present in the insertion direction of the fastening screw 5 but can also be present contrary to the insertion direction of the fastening screw 5. Therefore, the dragging element 30 may allow a process-safe assembly of the multipart adjustment element 1. The same applies to the dragging element 30' according to FIG. 6.

In a next step, the abutment disc is arranged adjacent to the first axial end 32 of the dragging element 30. In this case, the chamfer 54 with the knurling 56 is located at the side of the abutment disc 50 which faces away from the threaded bush 10.

Finally, the securing sleeve 60 is inserted into the continuous bore 16 of the threaded bush 10 and is fastened in it at least partially in a press fit. The inserting or pressing-in of the securing sleeve 60 causes the projections 40 to embed into the step 20 at the first axial end 32 of the dragging element 30. By that, a first anti-rotation protection is provided between dragging element 30 and threaded bush 10. Furthermore, axial tolerances may be compensated when assembling the adjustment element 1.

In addition, the projections 40 embed at the second axial end 34 into the second axial end 64 of the securing sleeve 60. This provides a second anti-rotation protection between dragging element 30 and securing sleeve 60. In this way, the dragging element 30 is, in the longitudinal direction of the threaded bush 10, clamped between the step 20 of the threaded bush 10 and the second axial end 64 of the securing sleeve 60. Furthermore, an additional compensation possibility of axial tolerances may be connected with the establishing of the second anti-rotation protection.

When using the dragging element 30' according to FIG. 6, the axially compressible webs 42 additionally arch elastically radially inwardly due to the axial excess. That means that with the dragging element 30', tolerances caused by production of the multipart adjustment element 1 may be compensable and in a reliable way, a clamping of the dragging element 30' between the step 20 of the threaded bush 10 and the second axial end 64 of the securing sleeve 60 is realizable.

With regard to a later use of the multipart adjustment element 1 in a tolerance compensation arrangement, the inserting or pressing-in of the securing sleeve 60 takes place in the insertion direction of the fastening screw 5 so far that the flange 68 is arranged flush with the side of the abutment disc 50 which faces away from the threaded bush 10 is arranged or in the portion of the chamfer 54 of the abutment disc 50. Accordingly, the flange 68 has an outer diameter which is larger than the diameter of the passage opening 50. The knurling 56 of the abutment disc 50 may dig into the flange 68 so that by that, a third anti-rotation protection between abutment disc 50 and securing sleeve 60 is formed.

Finally, the conical form of the knurling 72 of the securing sleeve 60 makes it possible that a fourth anti-rotation protection develops between the threaded bush 10 and the securing sleeve 60. As a result, all components of the multipart adjustment element 1 are thus connected with each other in an anti-rotation rotating manner.

Now with reference to FIGS. 4 and 5, an embodiment of the tolerance compensation arrangement is explained. The tolerance compensation arrangement comprises the multipart adjustment element 1, a basic element 3, in the present case in the form of a blind rivet nut, as well as a fastening screw 5.

The basic element 3 is fastened at the first component A in the known manner and includes a first inner thread 80 of a first thread direction, which is in engagement with the outer thread 18 of the threaded bush 10 of the multipart adjustment element 1. Furthermore, the basic element 3 includes a second inner thread 82 with a second thread direction which is contrary to the first thread direction. In use, as is illustrated in FIG. 5, the second inner thread 82 interacts with an outer thread 90 of the fastening screw 5. In the example illustrated in FIG. 4, the multipart adjustment element 1 is screwed into the basic element 3 as far as possible and is in an initial position.

In use, an opening a second component B is arranged above the first component A and the fastening screw 5 is plugged through the opening in the second component B as well as through the passage openings 52 and 66 of the abutment disc 50 and the securing sleeve 60 and into the continuous bore 16 of the threaded bush 10, until it engages with the spring arms 38 of the dragging element 30. When the fastening screw 5 is now rotated, the multipart adjustment element 1 co-rotates via the dragging element 30 by means of friction fit and is by that screwed out of the basic element 3 contrary to the insertion direction for the purpose of tolerance compensation, until the abutment disc 50 abuts the second component B. Subsequently, a screwing together of the outer thread 90 of the fastening screw 5 with the second inner thread 82 of the basic element 3 takes place for tensioning the two components A, B.

With reference to FIG. 7, an embodiment of a manufacturing method of the multipart adjustment element 1 is described in the following. In a first step A, a providing of a threaded bush 10, a dragging element 30; 30', an abutment disc 50 as well as of a securing sleeve 60 takes place. Here, the step of providing the dragging element 30; 30' includes as a further step E a punching of the dragging element 30; 30' as a strip or in the form of a strip out of a metal layer and a bending of the punched dragging element 30; 30' into a tube shape so that a slot 36 is present in the longitudinal direction of the dragging element 30; 30' and the outer diameter is changeable.

In a subsequent step B, an inserting of the dragging element 30; 30' into the threaded bush 10 may take place from the first axial end 12, by reducing an outer diameter of the dragging element 30; 30' before the inserting and subsequent relieving. After that, the abutment disc 50 is arranged adjacent to the first axial end 12 of the threaded bush 10 (step C) and the securing sleeve (60) is arranged at least partially in a press fit in the bore (16) of the threaded bush (10) (step D) in order to tightly connect the abutment disc (50), the threaded bush (10) and the dragging element (30; 30') with each other.

A connection method for connecting a first component A with a second component B by means of the tolerance compensation arrangement with a fastening screw is explained with respect to FIG. 8. First of all, a fastening of the basic element 3 at the first component A takes place in step a. After that, in step b, the fastening screw 5 is plugged into the passage opening of the tolerance compensation arrangement through an opening in the second component B. Subsequently, in step c, a rotating of the fastening screw 5 takes place until the abutment disc 50 abuts the second component B. Finally, the first A and the second component B are tensioned with each other by the interacting of the outer thread 90 of the fastening screw 5 with the second inner thread 82 of the basic element 3 in step d.

The invention claimed is:

1. A multipart adjustment element for a tolerance compensation arrangement for the automatic compensation of tolerances in the spacing between a first and a second component, including:
   a. a threaded bush having a passage bore, an outer thread of a first thread direction as well as a step that is formed inside of the threaded bush so that a first inner diameter adjacent to the first axial end of the threaded bush is larger than a second inner diameter adjacent to the second axial end of the threaded bush,
   b. a dragging element with at least one radially inwardly protruding spring arm wherein the dragging element is arranged with a first axial end on the step which is formed in the threaded bush, as well as
   c. an abutment disc adjacent to the first axial end of the threaded bush which includes a passage opening, and
   d. a securing sleeve with passage opening which is arranged at least partially in a press-fit in the bore of the threaded bush in order to tightly connect the abutment disc, the threaded bush and the dragging element with each other.

2. The multipart adjustment element according to claim 1, in which the dragging element has a continuous slot extending along the longitudinal axis.

3. The multipart adjustment element according to claim 2, in which the at least one spring arm of the dragging element is attached on one side, only so that the at least one spring arm has a free end.

4. The multipart adjustment element according to claim 2, in which the dragging element has a plurality of projections extending in the longitudinal direction at its first and at its second axial end, the projections forming a first anti-rotation protection in connection with the step and a second anti-rotation protection in connection with the securing sleeve.

5. The multipart adjustment element according to claim 2, in which the dragging element comprises a plurality of axially compressible webs.

6. The multipart adjustment element according to claim 2, in which the passage opening of the abutment disc has a chamfer at the side which faces away from the threaded bush.

7. The multipart adjustment element according to claim 2, in which the securing sleeve has a flange at a first axial end and a knurling adjacent to a second axial end at a radial outside, so that the securing sleeve engages adjacent to the first axial end, in particular with the flange, with the abutment disc, at the second axial end with a second axial end of the dragging element and at the radial outside at least partly with the radial inside of the threaded bush.

8. The multipart adjustment element according to claim 7, in which the knurling has a conical form so that the knurling engages with the inside of the threaded bush and forms a fourth anti-rotation protection.

9. The multipart adjustment element according to claim 1, in which the at least one spring arm of the dragging element is attached on one side, only so that the at least one spring arm has a free end.

10. The multipart adjustment element according to claim 1, in which the dragging element has a plurality of projections extending in the longitudinal direction at its first and at its second axial end, the projections forming a first anti-rotation protection in connection with the step and a second anti-rotation protection in connection with the securing sleeve.

11. The multipart adjustment element according to claim 1, in which the dragging element comprises a plurality of axially compressible webs.

12. The multipart adjustment element according to claim 1, in which the passage opening of the abutment disc has a chamfer at the side which faces away from the threaded bush.

13. The multipart adjustment element according to claim 1, in which the securing sleeve has a flange at a first axial end and a knurling adjacent to a second axial end at a radial outside, so that the securing sleeve engages adjacent to the first axial end, in particular with the flange, with the abutment disc, at the second axial end with a second axial end of the dragging element and at the radial outside at least partly with the radial inside of the threaded bush.

14. The multipart adjustment element according to claim 13, in which the knurling has a conical form so that the knurling engages with the inside of the threaded bush and forms a fourth anti-rotation protection.

15. The multipart adjustment element according to claim 1, in which the securing sleeve includes an outer chamfer at a second axial end.

16. The multipart adjustment element according to claim 1, wherein the threaded bush, the dragging element, the abutment disc and the securing sleeve are made of steel or stainless steel.

17. A tolerance compensation arrangement with a multipart adjustment element according to claim 1 and a basic element, wherein
   the basic element is fastened at the first component and includes a first inner thread of a first thread direction, which is in engagement with the outer thread of the threaded bush of the multipart adjustment element, and
   the basic element includes a second inner thread with a second thread direction, which is opposite to the first thread direction, wherein in use, the second inner thread interacts with an outer thread of a fastening screw, so that
   the fastening screw, when being inserted into the multipart adjustment element and being rotated, co-rotates the multipart adjustment element via the dragging element through friction connection, thereby screwing it out of the basic element contrary to the insertion direction for the purpose of tolerance compensation and, when the adjustment element has abutted the second component, is screwable with the second inner thread of the second thread direction for the purpose of tensioning both components.

18. The tolerance compensation arrangement according to claim 17 in which the basic element is a blind rivet nut.

19. The tolerance compensation arrangement according to claim 17, furthermore including a fastening screw.

20. A connection between a first and a second component by means of the tolerance compensation arrangement according to claim 19.

* * * * *